United States Patent [19]
Murphy

[11] Patent Number: 6,069,735
[45] Date of Patent: May 30, 2000

[54] VIEWER WITH ENHANCED WIDE FIELD VIEW

[76] Inventor: George Joseph Murphy, 1652 Andover Way, Petaluma, Calif. 94954

[21] Appl. No.: 09/210,272

[22] Filed: Dec. 10, 1998

[51] Int. Cl.[7] .................................................. G02B 23/00
[52] U.S. Cl. ............................................ 359/408; 359/474
[58] Field of Search ................................... 359/408, 474, 359/477, 480

[56] References Cited

U.S. PATENT DOCUMENTS

| | | | |
|---|---|---|---|
| 3,734,596 | 5/1973 | Nerlich | 350/140 |
| 4,172,633 | 10/1979 | Hashimoto et al. | 350/140 |
| 4,175,828 | 11/1979 | Carver | 350/140 |
| 4,242,818 | 1/1981 | Carver | 40/364 |
| 4,253,732 | 3/1981 | Carver | 350/140 |
| 4,357,073 | 11/1982 | Carver | 350/140 |
| 4,773,747 | 9/1988 | Bresnahan | 359/408 |
| 4,846,553 | 7/1989 | Rice | 350/250 |
| 5,000,543 | 3/1991 | Curtin | 350/140 |
| 5,084,781 | 1/1992 | Gregorio | 359/466 |
| 5,309,281 | 5/1994 | Rover | 359/474 |
| 5,381,266 | 1/1995 | Mizukawa et al. | 359/466 |
| 5,390,047 | 2/1995 | Mizukawa | 359/466 |

*Primary Examiner*—Mark Robinson
*Attorney, Agent, or Firm*—Meyer Intellectual Property Law; Virginia H. Meyer, Esq.; Mark J. Spolyar, Esq.

[57] ABSTRACT

A viewer that creates an enhanced and immersive image is disclosed. Also disclosed is a novel collapsible viewer that assembles into a substantially rigid structure to maintain proper optical alignment of the lenses and the image(s). This viewer also excludes extraneous light, while allowing the user to focus the device to compensate for variations in eyesight of the users. Also disclosed is a novel means for interchanging images and locking them into optical alignment with the lenses of the viewer.

14 Claims, 8 Drawing Sheets

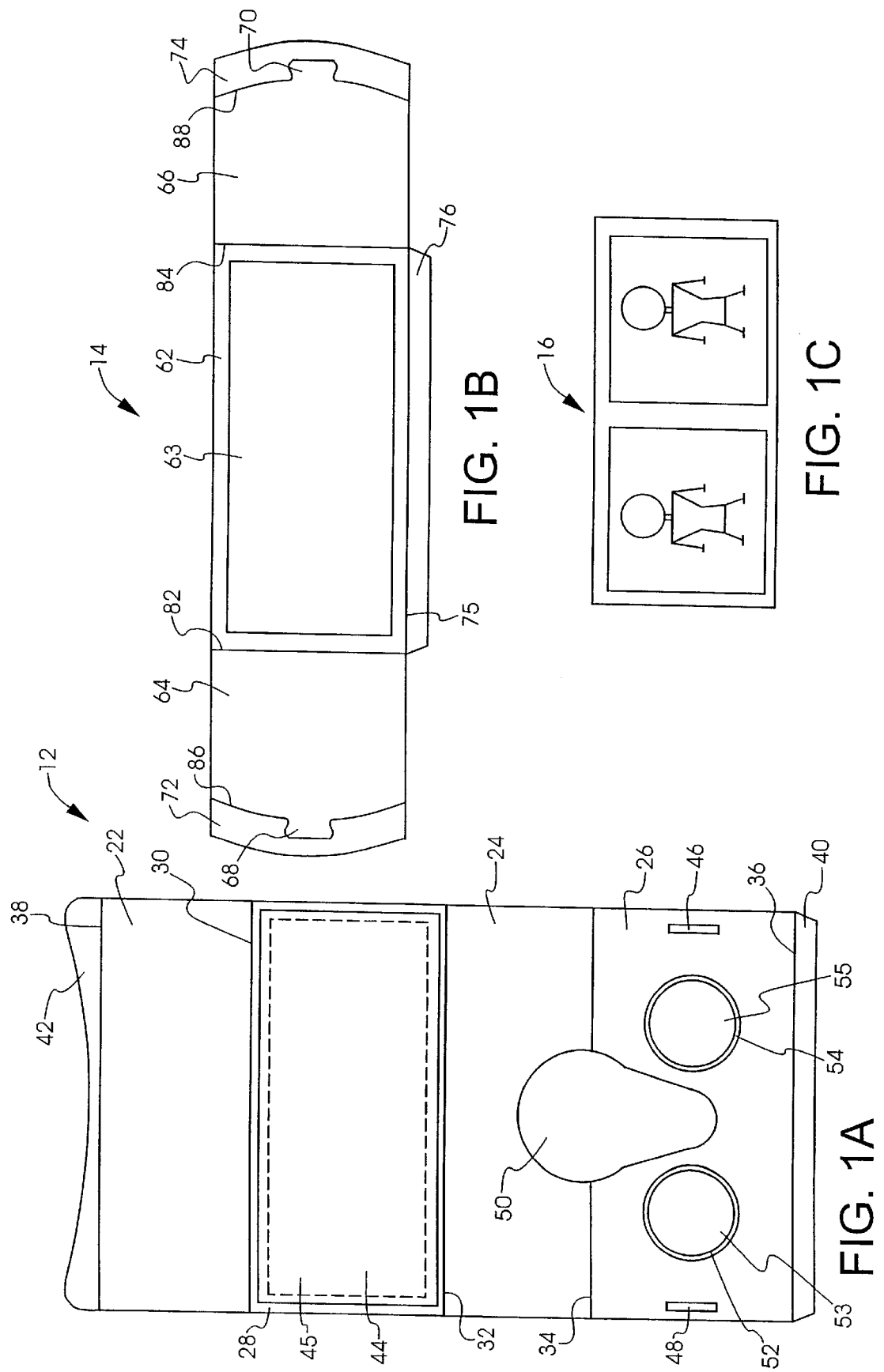

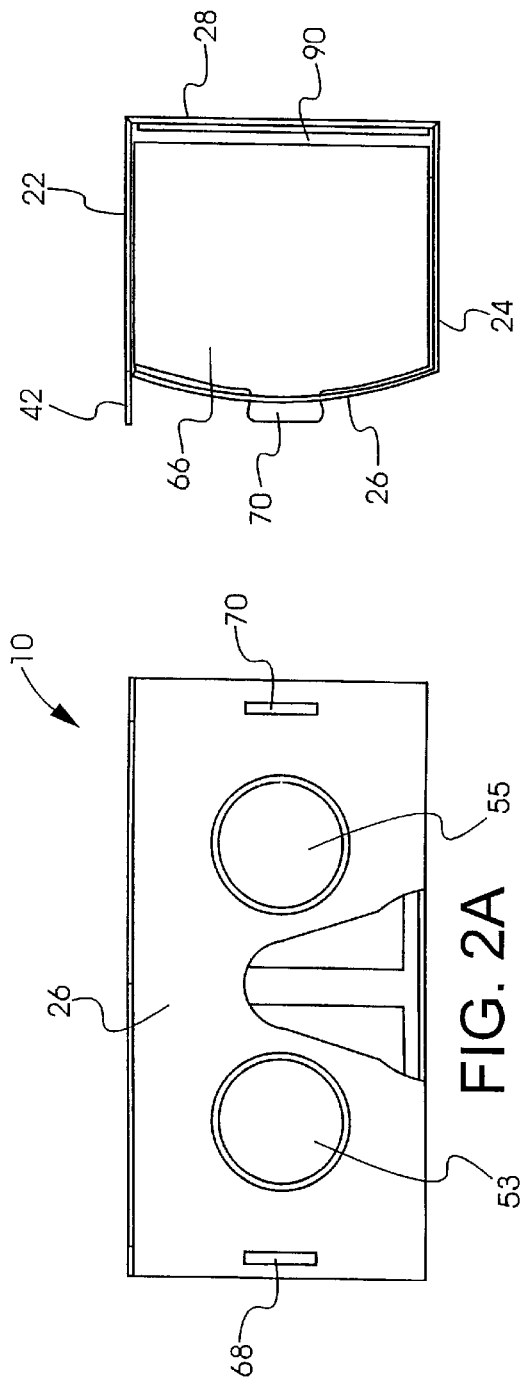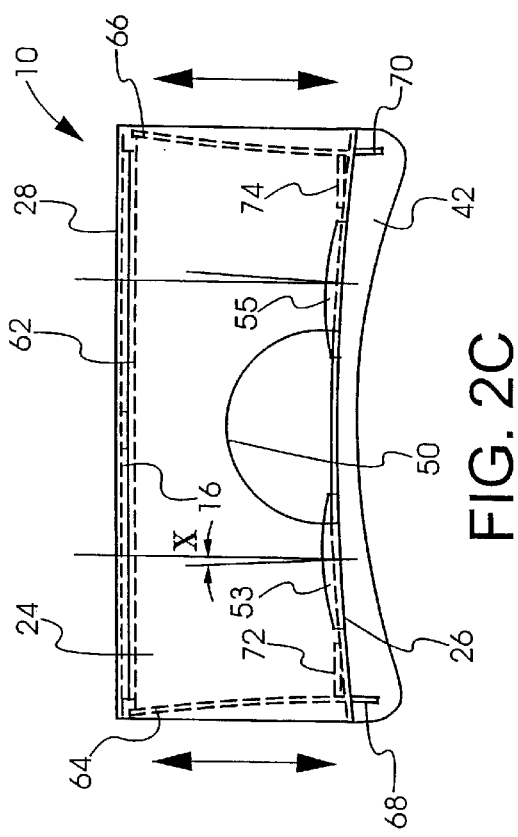

VIEWER WITH ENHANCED WIDE FIELD VIEW

FIELD OF THE INVENTION

The present invention relates to viewers, such as hand held or helmet mounted viewers. More particularly, the present invention relates to viewers with an enhanced and immersive view and a novel focusing mechanism.

BACKGROUND OF THE INVENTION

There are many types of viewers known in the art. These viewers have been constructed in various shapes and sizes, some of which are relatively inexpensive to manufacture. Examples of variations on viewers can be found in U.S. Pat. No. 3,850,505 which discloses a Viewmaster™ type of device.

In designing and producing viewers, one universally recognized principle is that a clear and distinct image requires proper alignment of the optical components of the viewer with the image(s). Another recognized principle is that a viewer must compensate for differences in eyesight among users, i.e. being near sighted or farsighted, to ensure that a broad range of users can use the viewer and still see a clear image. To that end, viewers must employ some form of focusing means. Additionally, principles of optics teach that extraneous light entering a viewer decreases the clarity of the image. For example, in three-dimensional stereoscopic viewers, a viewer that excludes extraneous light enhances the three-dimensional effect and increases the clarity and illusion of reality of the image.

The demands of the market have imposed additional requirements on viewers. Specifically, for mass market purposes, there is a need for inexpensive viewers that are foldable or collapsible into compact and easy to handle configurations. For example, collapsible stereoscopic viewers have been used in promotional mailers. To meet this objective, collapsible viewers have been devised such that they collapse into mailable configurations U.S. Pat. No. 5,136,423 issued to Curtin on Aug. 4, 1992 discloses a stereoscopic viewer that collapses into mailable form. The collapsible viewers of the prior art, however, have sacrificed some of the principles discussed above to create viewers that are more marketable in the promotional products industry.

One example of a collapsible stereoscopic viewer is disclosed in U.S. Pat. No. 5,309,281 ('281) issued to Rover on May 3, 1994. Rover teaches a stereoscopic viewer incorporating a foldable hexagonal frame. The hexagonal frame supports a lens bearing wall that is opposite to an image-bearing wall. To collapse the device of this invention, the user simply pushes two opposite walls of the frame together. To focus the viewer disclosed in the '281 patent, the user squeezes the hexagonal frame to adjust the distance between the lens-bearing wall and the image-bearing wall. The device of the '281 patent, however, makes no provision to keep out extraneous light. Additionally, the assembly does not result into a rigid structure. Therefore, the alignment between the lenses and the images is often imprecise.

U.S. Pat. No. 5,136,423 ('423) issued to Curtin discloses a collapsible stereoscopic viewer with a folding septum wall that locks the foldable assembly into a box configuration. Although the viewer disclosed in the '423 patent ensures alignment of the lens with the image, this device makes no provision for the user to focus the viewer to accommodate for differences in eyesight. Additionally, this structure has no components to shut out extraneous light.

U.S. Pat. No. 4,846,553 ('553) issued to Rice discloses yet another collapsible viewer that folds into mailable form. Rice describes his foldable viewer as a bellows-like fold construction, wherein the top, bottom and side walls have transverse fold lines that allow the viewer to be collapsed. The '553 patent teaches that these transverse fold lines also allow the user to focus the viewer by squeezing the top and bottom walls together. However, according to the '533 patent, the viewer does not lock into a rigid structure to ensure optical alignment of the stereoscopic components. Additionally, the configuration of the viewer allows extraneous light to enter the viewer through gaps between the various walls of the viewer.

U.S. Pat. Nos. 4,175,828 ('828), 4,253,732 ('732), and 4,357,073 ('073) issued to Carver all disclose different versions of a collapsible stereoscopic viewer. These references disclose a viewer where two opposing lateral walls have extensions that bend around the rear wall and attach to form a channel for the receipt of a film strip having pairs of stereoscopic images. These references also disclose a focus feature created by transverse fold lines in the lateral walls much like the Rice '533 patent. These references do not disclose a viewer that locks into a rigid assembly. Accordingly, misalignment of the images and the optical means may result from this viewer's inability to "lock" into a rigid structure.

While the viewers of the prior art fulfill their respective objectives and requirements, they do not include or suggest a viewer that provides an enhanced and immersive image by the configuration of large images positioned in close proximity to large magnification lens. Further, the collapsible viewers of the prior art do not describe or suggest a box-like collapsible viewer having a side wall lock and tensioning mechanism that tenses the box-like viewer assembly into a rigid structure. The prior art viewers also do not describe or suggest a collapsible viewer wherein the side walls further predispose a lensbearing wall to create a means to focus the viewer. Furthermore, the prior art viewers do not describe or suggest a collapsible stereoscopic viewer wherein the lens bearing wall flexes inwardly to slightly diverge the focal axes of the lenses in the horizontal direction to allow the user to view a wider field.

A significant aspect of the viewer is that it achieves the described high image magnification and wide field of view while folding to a size no larger in its dimensions than a standard cd-jewel case, in large part due to the arcuate fold in the viewers side flaps. This allows the viewer a unique marketing advantage in packaging with other products such as cd-rom software and music CD's.

SUMMARY OF THE INVENTION

The present invention comprises a viewer that creates an enhanced wide filed view and immersive image. The invention also comprises a novel collapsible viewer that assembles into a substantially rigid structure to maintain proper optical alignment of the lenses and the image(s). This viewer also excludes extraneous light, while allowing the user to focus the device as needed for his or her eyesight. In another embodiment, the present invention comprises novel means for interchanging images and locking them into optical alignment with the lenses of the viewer.

In the broadest sense, the viewers of the present invention may be made of any suitable material, such as paper, paperboard, plastic, metal, and the like, or any suitable combination of these materials. When used to make the viewers of the invention, suitable materials will be opaque, or will be treated with materials or substances that render them opaque, so that the viewers thus constructed will not permit unwanted extraneous light to interfere with the immersive viewing experience provided by the teaching of the present invention. Collapsible viewers of the present invention will be made of any suitable "opaque" pliable material, especially, paper, paperboard, and/or plastic. Further, the teachings of the present invention have special application in stereoscopy, virtual reality and regular Viewmaster™ types of viewers.

In the broadest context, the viewers of the present invention comprise a housing having a front lens-bearing wall and a rear image-bearing wall. In a preferred collapsible form, the viewers of the present invention are of a box-like assembly, comprising a front lens-bearing wall, a rear image-bearing wall, top, bottom and two side walls.

As stated above, the present invention provides a viewer that achieves an enhanced and immersive image as seen by the user. Most viewers, especially collapsible viewers, incorporate small images and lower magnification lenses. While these viewers provide a viewable image, the user perceives a small image at a considerable distance, which diminishes the sensation and impact of the images on the user. The present invention recognizes that with any given image, whether it be a real image or a stereoscopic 3-D image, when an image is positioned further from the user, the user perceives less detail, whether it be two- or three-dimensional detail, and feels less immersed or surrounded by the image. To overcome this problem, the present invention teaches the use of a short image distance, that is, placing the image in close proximity to the user's eyes, i.e., at a distance of between about 45 and 60 millimeters. (This distance from the image to the user's eyes is referred to herein as the image distance.) Because of the short image distance, the viewers of the present invention employ higher magnification lenses than the viewers of the prior art to ensure that the image is in focus at these close distances. Additionally, in order to achieve a clear and wide field of view, viewers made according to the teachings of the present invention incorporate large images and large diameter high magnification lenses that have a focal distance approximately equal to the image distance (45–60 mm).

The images used in the present invention are generally arranged in complementary pairs on an image strip. According to the teaching of the present invention, each image of a respective pair ranges in size from about 52×57 millimeters to about 57×60 millimeters, with a preferred area of about 57×57 millimeters. The centers of each image are preferably spaced from about 60 to about 65 millimeters apart. To assist the user in converging these large images that stand only a short distance from the user's eyes, the viewers of the present invention also diverge the focal axes of the lenses in the horizontal direction. More specifically, the focal axes of the lenses will diverge from one another at an angle of between 0 degrees to about 10 degrees from parallel. This aspect of the invention has a special application in stereoscopy, where image convergence by the user is essential in order to see a 3-D image from complementary stereoscopic image pairs. The configuration of having the focal axes of the lenses diverge from one another from 0 to about 10 degrees allows the user to achieve an enhanced experience of feeling immersed in the image by literally bringing the user close up to a wide field image. Because the user perceives this wide field image from such a small distance away, the various disparate aspects of the image are more discernible and the user feels more immersed in the image. By way of example, when this invention is applied to stereoscopic images, this immersive feeling gives the user a more enhanced illusion of three-dimensionality.

Furthermore, this divergence of the focal axes of the lenses allows the use of stereoscopic images that create a greater sense of depth by assisting the user in converging the more extreme displacements of various corresponding elements in each of the complementary image pair.

According to another aspect of the invention, many of the mechanical advantages of the present invention are attained by a novel side wall configuration of the preferred collapsible viewer, which is made of suitable opaque pliable material, such as paperboard or plastic. The present invention teaches the use of a novel side wall that is configured to create a lock and tensioning mechanism that tenses the viewer into a rigid configuration. Specifically, the side wall has an inner edge and an outer edge. The inner edge of each side wall attaches to or is in some manner positioned against the rear wall of the viewer. The outer edge of the side wall has a tongue flap extending therefrom defined in part by a fold line. The outer edge further has a tab defined by a slit cut in the central region of the fold line. When the tongue is folded inwardly along this fold line, the tab cut into the outer edge is exposed. In this configuration the tab inserts into a slit opening cut into the front wall of the viewer. The length of the side wall is such that the side wall flexes outwardly when the tab is inserted into the slit opening. To lock and tension the viewer into a substantially rigid assembly, the user simply presses the side walls inwardly. Consequently, the tongue flap, the tab and the length of the side wall cooperate to lock the side wall into an arcuate profile that tenses the front wall of the viewer. Since each of the walls of the "collapsible" viewer are attached to one another, the entire assembly is placed in tension and thereby locked into a substantially rigid structure.

This side wall configuration also achieves the enhanced focus adjusting system of the present invention. Specifically, the outer edge of the side wall that is defined by the fold line discussed above is substantially arcuate in profile. This arcuate edge of the side wall contacts the lens-bearing front wall, forcing it to conform to this arcuate profile. This action predisposes the front wall to flex outwardly to adjust the focus of the viewer, when the user squeezes the top and bottom walls.

According to another aspect of the present invention, the locking side wall feature substantially excludes extraneous light, while still allowing the user to focus the viewer. Specifically, the side walls contact the top and bottom walls of the viewer along their respective top and bottom edges. This edge contact helps to seal off the otherwise opaque portions of the inside of the viewer from extraneous light. The novel locking feature of the side walls, nevertheless, allows the top and bottom walls to be displaced. Namely, the configuration of the tab and tongue flap causes the side walls to flex inwardly when the side walls are in the locked position. This inwardly flexed predisposition in turn allows the side walls to flex further inwardly and maintain the exclusion of extraneous light, when the top and bottom walls are squeezed together to focus the viewer.

Another aspect of the present invention provides a novel image strip locking channel. An image strip containing a pair of complementary images is placed in a channel created by the rear wall and a frame wall that rests inside the box-like assembly of preferred viewers of the invention. The side wall flaps of the present invention are attached to opposite lateral edges of the frame wall. When the side wall flaps are locked and placed under tension as discussed above, the attached frame wall is forced against the image strip and the rear wall to thereby lock the image strip in place. This configuration also allows the user to easily change image strips by first releasing the tension on the side walls. As a result, the frame wall no longer locks the image strip. The user is then free to slide the first image strip out and replace it with a second image strip. Alternatively, the image strip may be a longer strip containing more than one pair of complementary images. In this configuration, the user simply slides the strip within the channel and locks the strip into place as desired.

In this respect, before explaining preferred embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

OBJECTS OF THE INVENTION

It is an object of the present invention to provide a viewer that displays an enhanced, immersive image.

It is another object of the present invention to provide a stereoscopic viewer that creates a clear and immersive three-dimensional effect.

It is another object of the present invention to provide a collapsible viewer that assembles into a substantially rigid structure, thereby ensuring optical alignment of the image pairs and the viewing lenses.

It is another object of the present invention to provide a collapsible viewer that assembles into a substantially rigid structure and allows the user to focus and adjust the optical components therein.

It is yet another object of the present invention to provide a collapsible viewer that incorporates a novel focus feature that admits little, if any, extraneous light.

It is still another object of the present invention to provide a collapsible viewer that allows the user to interchange images and lock them into optical alignment.

Yet another object of the present invention is to provide a new viewer that may be easily and efficiently manufactured.

These together with other objects of the present invention, along with the various features of novelty that characterize the invention, are pointed out with particularity in the claims annexed to and forming part of this disclosure. For a better understanding of the invention, its operating advantages and the specific objects attained by its uses, reference should be had to the accompanying drawings and descriptive matter in which there is illustrated preferred embodiments of the invention.

The more important features of the invention have thus been outlined, rather broadly, so that the detailed description thereof that follows may be better understood, and in order that the present contribution to the art may be better appreciated. Additional features of the invention will be described below.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 1A, 1B and 1C show plane views of the components in a first preferred embodiment of the present invention in a spread orientation; FIG. 1A shows a main box assembly; FIG. 1B shows a side wall assembly; and FIG. 1C shows a stereoscopic image strip.

FIGS. 2A, 2B, and 2C; FIG. 2A is a front view of the first preferred embodiment constructed in accordance with the principles of the present invention; FIG. 2B is a side view of the first preferred embodiment; and, FIG. 2C is a bottom view of the first preferred embodiment.

FIG. 3A illustrates the insertion of the side flaps of the first preferred embodiment; FIG. 3B illustrates the locking tabs of the first preferred embodiment; FIG. 3C illustrates the insertion of an image strip into a channel; FIG. 3D illustrates the locking feature of the present invention; and, FIG. 3E illustrates the collapsible nature of the first preferred embodiment.

FIGS. 5A, 5B, and 5C sequentially illustrate the assembly of a second preferred embodiment; and, FIG. 5D illustrates the collapsible nature of the second preferred embodiment.

The same reference numbers refer to the same parts throughout the various Figures.

DESCRIPTION OF A FIRST PREFERRED EMBODIMENT

Figure 3A:
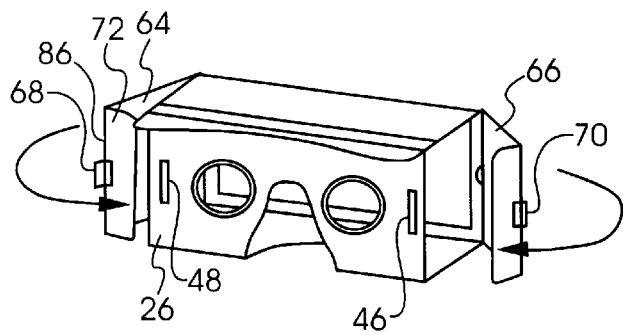
FIGS. 3A, 3B, 3C, 3D, and 3E.

With reference to the drawings, and in particular, to FIGS. 1–3E thereof, a first preferred embodiment of the new collapsible viewer embodying the principles and concepts of the present invention and generally designated by the reference number 10 will be described.

Specifically, the various Figures show that in one aspect the invention relates to a collapsible viewer that assembles into a substantially rigid box-like configuration that still allows the user to focus the image by squeezing the top and bottom walls together. In its one context, the invention comprises a main box assembly and a side wall flap assembly designed to lock the main box assembly into the desired substantially rigid configuration. Such components are individually configured and correlated with respect to each other so as to attain the desired objective.

More specifically, in the first preferred embodiment the present invention is a viewer 10 as shown in FIGS. 1–3E. As shown in FIGS. 1A–C, viewer 10 has a main box assembly 12, a side wall flap assembly 14, and stereoscopic image strip 16. Main box assembly 12 has a top wall 22, a bottom wall 24, a front wall 26 and a rear wall 28. Top wall 22, bottom wall 24, and front wall 26 are opaque. Main box assembly 12 further has glue or adhesive flap 40 and light visor 42. As shown in FIG. 1A, the above mentioned components are integrally attached to one another along fold lines 30, 32, 34, 36, and 38, respectively.

Front wall 26 includes a pair of lens-receiving openings 52 and 54. A pair of optical lenses 53 and 55 are affixed to front wall 26 directly over openings 52 and 54. Lenses 53 and 55 in this preferred embodiment are plano-convex lens having a focal distance of about 51 millimeters and a diameter of about 25 millimeters. In this preferred form, lenses 53 and 55 are separated from one another by a distance of about 63 millimeters. Top wall 22 and bottom wall 24 are of an appropriate length such that preferred viewer 10 assembles to separate the lens-bearing front wall 26 approximately 51 millimeters from the image-bearing rear wall 28. Front wall 26 also has slit openings 46 and 48 there through. Rear wall 28 is opaque, but has a large window-like opening 44 over which transparent, translucent, or other light transmissive means are attached by any suitable means, such as adhesive. In this embodiment, a sheet of translucent plastic 45 is placed over window opening 44. Additionally, box assembly 12 has nose cutout section 50 through both front wall 26 and bottom wall 24. To construct main box assembly 12, the walls of main box assembly 12 are folded along their respective fold lines to form a box as shown in FIGS. 2A–3D. Next, adhesive couples glue tab 40 to top wall 22 along fold line 38.

Next, provided in viewer 10 is side wall flap assembly 14. Side wall assembly 14 has frame wall 62, left side wall 64, and right side wall 66, all of which are also opaque. Frame wall 62 has large window cutout 63 substantially corresponding to window opening 44 of main box assembly 12. Frame wall 62 further has affixing or glue tab 76 integrally extending therefrom along fold line 75. (See FIG. 1B.)

Left and right side walls 64 and 66 are integrally attached to frame wall 62 along vertical fold lines 82 and 84, respectively. Left side wall 64 has arcuate fold line 86 with a slit cut in the central region thereof to define insert tab 68. Left side wall 64 further has tongue 72 integrally attached thereto along arcuate fold line 86. (See FIG. 1B.) As shown in FIG. 3A, tongue 72 folds inwardly along arcuate fold line 86 to expose insert tab 68.

Right side wall 66 substantially mirrors left side wall 64. Right side wall 66 has arcuate fold line 88 with a slit cut in the central region thereof to define insert tab 70. Left side wall further has tongue 74 integrally attached thereto along arcuate fold line 88. As discussed directly above, tongue 74 folds inwardly along arcuate fold line 88 to expose insert tab 70. (See FIG. 1B).

Next, provided in the first preferred embodiment is image strip 16. In this embodiment, image strip 16 has a pair of stereoscopically matched images thereon. Preferably, each image on image strip 16 is approximately 57 millimeters in height and again approximately 57 millimeters in width. The centers of each image are spaced apart from one another at about 64 millimeters. Additionally, images having a high resolution are preferred to enhance the reality of the three-dimensional illusion. By way of example and in preferred forms, the image is made from a highly defined subject using fine grade photographic films having a fine grain film emulsion. (See FIG. 1C).

With particular reference to FIGS. 1A–3D, the assembly of viewer 10 proceeds as follows: Main box assembly 12 is folded along fold lines 30, 32, 34 and 36, and then glue flap 40 is coupled to top wall 22 with adhesive or other suitable coupling means. Side wall assembly 14 is inserted into the inner space defined by the walls of main box assembly 12. Adhesive or other suitable coupling means is used to couple glue tab 76 of side wall assembly 14 to bottom wall 24 of box assembly 12 along fold line 32. Thus, frame wall 62 is oriented such that it rests against rear wall 28 of box assembly 12. (See FIG. 2C.) Additionally, frame wall 62 is positioned such that window cutout 63 is centered with respect to window opening 44 of rear wall 28. As shown in FIG. 3A, side walls 64 and 66 are folded inwardly along their respective fold lines 82 and 84. Next, tongue 72 of left side wall 64 is folded inwardly along arcuate fold line 86 to expose insert tab 68. Tongue 72 is then inserted against front wall 26 and between top wall 22 and bottom wall 24 such that insert tab 68 engages slit opening 48 of front wall 26. Similarly, tongue 74 is then inserted against front wall 26 and between top wall 22 and bottom wall 24 such that insert tab 70 engages slit opening 46 of front wall 26. (See for example, FIG. 3A.) At this stage of the assembly and as shown in FIG. 3B, left and right side walls 64 and 66 are of sufficient length such that they flex outwardly when assembled as described above. Additionally, this assembly creates a channel 90 (shown in FIG. 2B) between rear wall 28 and frame wall 62 for the receipt of image strip 16 (FIG. 3C).

Figure 3B:
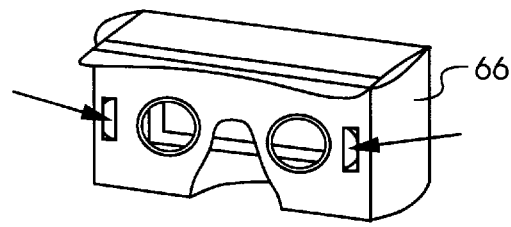
Figure 3C:
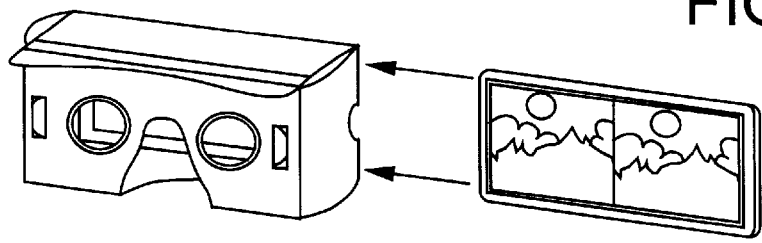
Figure 3D:
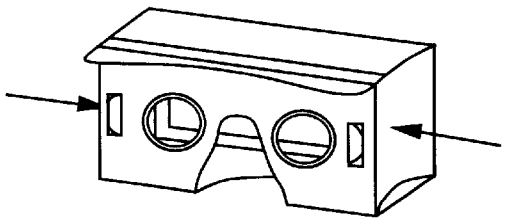

Next, image strip 16 is inserted into channel 90 as shown in FIG. 3C. The user then presses side walls 64 and 66 inwardly, as shown in FIG. 3D, to lock image strip 16 into channel 90. Specifically, when side walls 64 and 66 are pushed inwardly, their respective tongues 72 and 74 lock them into an inwardly flexed and substantially rigid position to displace frame wall 62 towards rear wall 28 of box assembly 12. Image strip 16 is thereby locked between frame wall 62 and rear wall 28. Further, this configuration allows the user to easily change the image strip. Specifically, the user need only release the tension on side walls 64 and 66 to unlock and release image strip 16. Next, the user replaces image strip 16 with another having a different pair of stereoscopic images and reapplies the tension to the side walls.

As shown in FIG. 2B, this locking action of right and left side walls 64 and 66 in combination with the arcuate profiles of fold lines 86 and 88, respectively, act to conform front wall 26 to a matching arcuate profile. This arcuate profile in front wall 26 creates the novel focus feature of the present invention. Specifically, the user focuses the viewer 10 by squeezing top wall 22 and bottom wall 24. Since front wall 26 has an arcuate profile, front wall 26 is predisposed to flex out to change the distance of lenses 53 and 55 to image strip 16. (See FIG. 3D.)

Further, viewer 10 excludes extraneous light, in addition to its novel focus feature. Both left and right side walls 64 and 66 contact top wall 22 and bottom wall 24 along their respective upper and lower edges. This contact excludes extraneous light from entering the viewer. The tongues 72 and 74 also predispose left and right side walls 64 and 66, respectively, to flex inwardly. Thus, when the user squeezes top wall 22 and bottom wall 24, left and right side walls 64 and 66 flex inwardly and maintain the desired light seal. (See FIG. 3A.)

This locking action of side walls 64 and 66 accomplishes other objects of the present invention. Namely, the force applied to front wall 26 by side walls 64 and 66 at slit openings 46 and 48, in combination with nose cutout 50, causes front wall 26 to have a second arcuate profile in the horizontal plane, as shown in FIG. 2C. Specifically, nose cutout 50 allows front wall 26 to warp at the position of the lenses, creating a divergent optical path that allows the user to more easily converge the two larger images. This second arcuate profile slightly diverges the focal axes of lenses 53 and 55 at about 6 degrees from the parallel (in this embodiment) to allow the user to observe a wider field of view. Furthermore, this locking assembly, wherein the side walls tension the box assembly 12, creates a viewer with a substantially rigid configuration. This rigidity helps to ensure that lenses 53 and 55 are properly aligned with the images on image strip 16. Thus, this optical configuration allows the user to experience a wide field image, with an angular field measured from the user's eyes of between about 75 to about 80 degrees in the horizontal. This represents a substantial improvement over the viewers of the prior art which generally achieve a comparatively smaller angular field at angles of between about 35 to about 50 degrees.

In summary, the first preferred embodiment assembles into a viewer having a substantially rigid structure. This viewer further enables the viewer to achieve an enhanced and immersive 3-D view. Specifically, the use of the large images in close proximity to and at the focal point of higher magnification lenses creates an enhanced and immersive quality to the image as seen by the user.

Figure 3E:
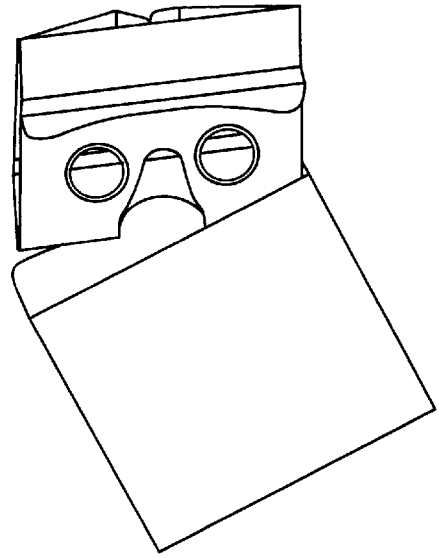

Further, FIGS. 3A, 3B, and 3C sequentially illustrate the assembly of a first preferred embodiment. FIG. 3E illustrates the collapsible nature of the viewer of this embodiment. In this first preferred embodiment, viewer 10 folds into an envelope that is substantially the same size as a compact disk (CD) case.

DESCRIPTION OF A SECOND PREFERRED EMBODIMENT

Figure 4:
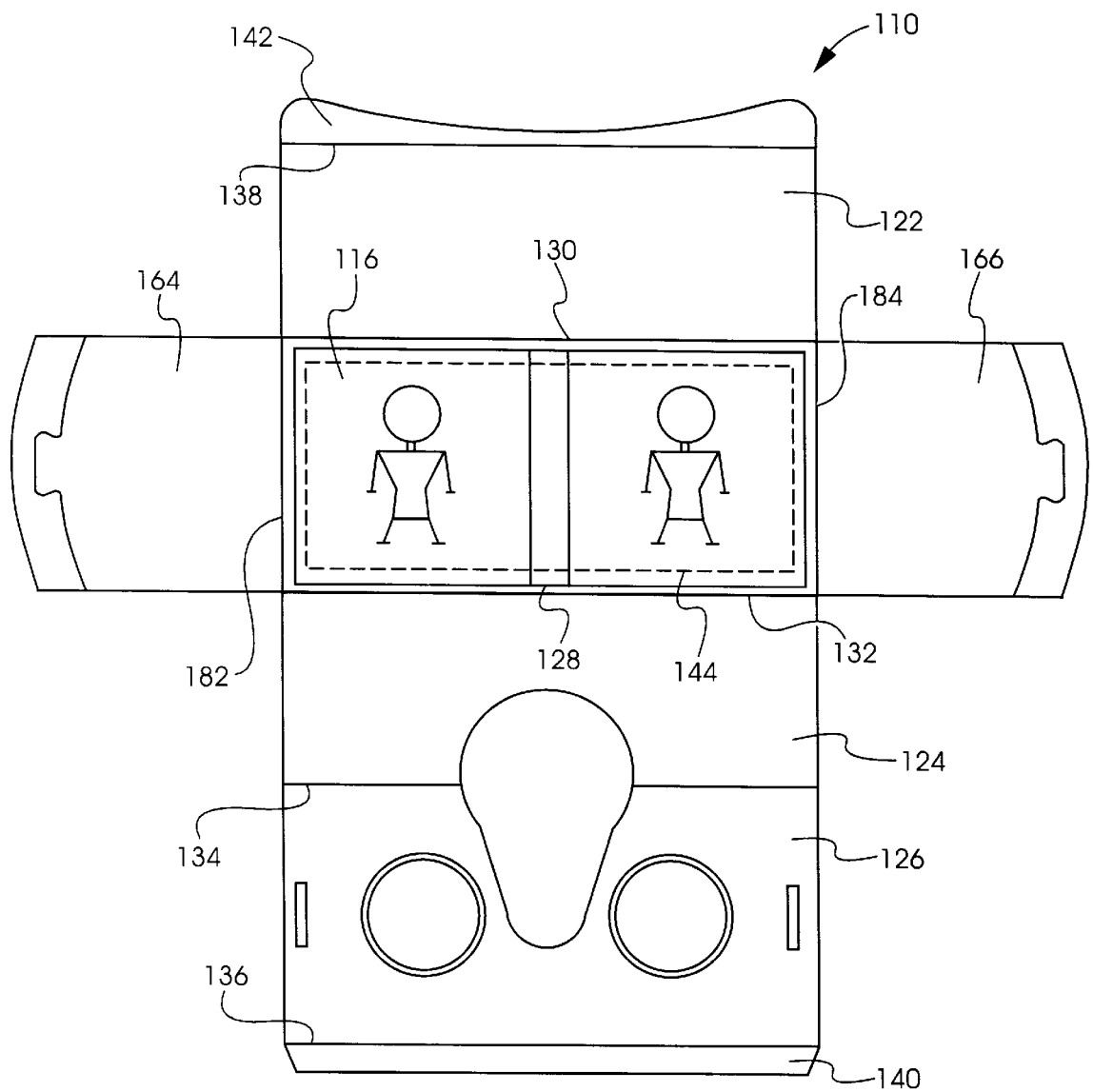
FIG. 4 is a plane view of a second preferred embodiment in a spread orientation.

The second preferred embodiment features a viewer with a pair of stereoscopic images permanently attached to the rear wall of the box assembly. This configuration eliminates the need for a frame wall. Accordingly, the left and right side walls are integrally attached along respective fold lines to the rear wall of the box assembly as shown in FIG. 4. Otherwise, the second preferred embodiment is substantially the same as the first preferred embodiment.

As shown in FIG. 4, viewer 110 comprises a top wall 122, a bottom wall 124, a front wall 126, a rear wall 128, right and left side walls 164 and 166, respectively, glue tab 140, and visor 142. As shown in FIG. 4, the above-mentioned components are each formed from a single piece of suitable opaque pliable material that has been folded along fold lines 130, 132, 134, 136, 182, and 184, respectively.

Rear wall 128 has a large window-like opening 144 over which an image strip 116 is placed. The image strip 116 of the second embodiment includes a light transmissive sheet laminated on the back face. This assembly takes the place of the translucent film 45 discussed in the description of the first preferred embodiment. Again, adhesive preferably couples image strip 116 to rear wall 128.

The remaining components, features and construction of the second preferred embodiment are substantially the same as the first preferred embodiment. Accordingly, reference should be had to the description of the first preferred embodiment, as such description will not be repeated herein.

Figure 5A:
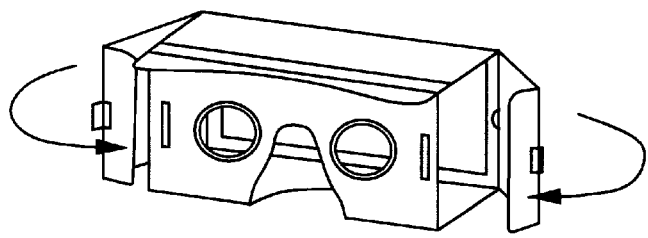
FIGS. 5A, 5B, 5C, and 5D.
Figure 5B:
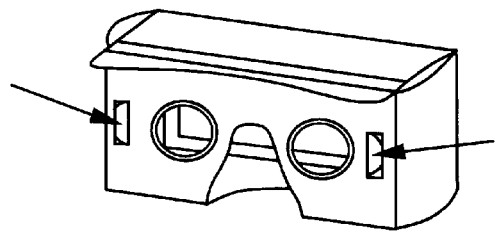
Figure 5C:
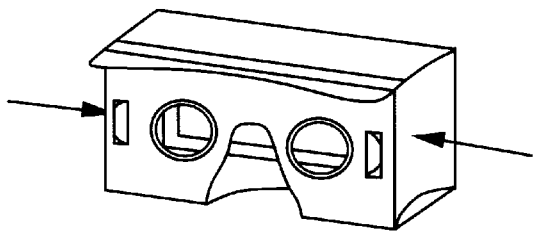
Figure 5D:
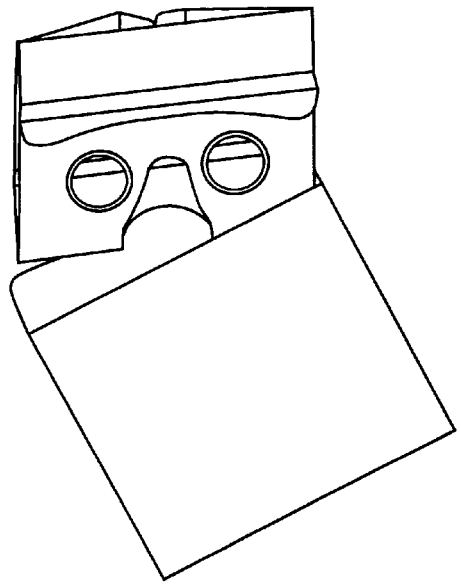

FIGS. 5A, 5B, and 5C sequentially illustrate the assembly of a second preferred embodiment; and, FIG. 5D illustrates the collapsible nature of the second preferred embodiment.

DESCRIPTION OF A THIRD PREFERRED EMBODIMENT

Figure 6:
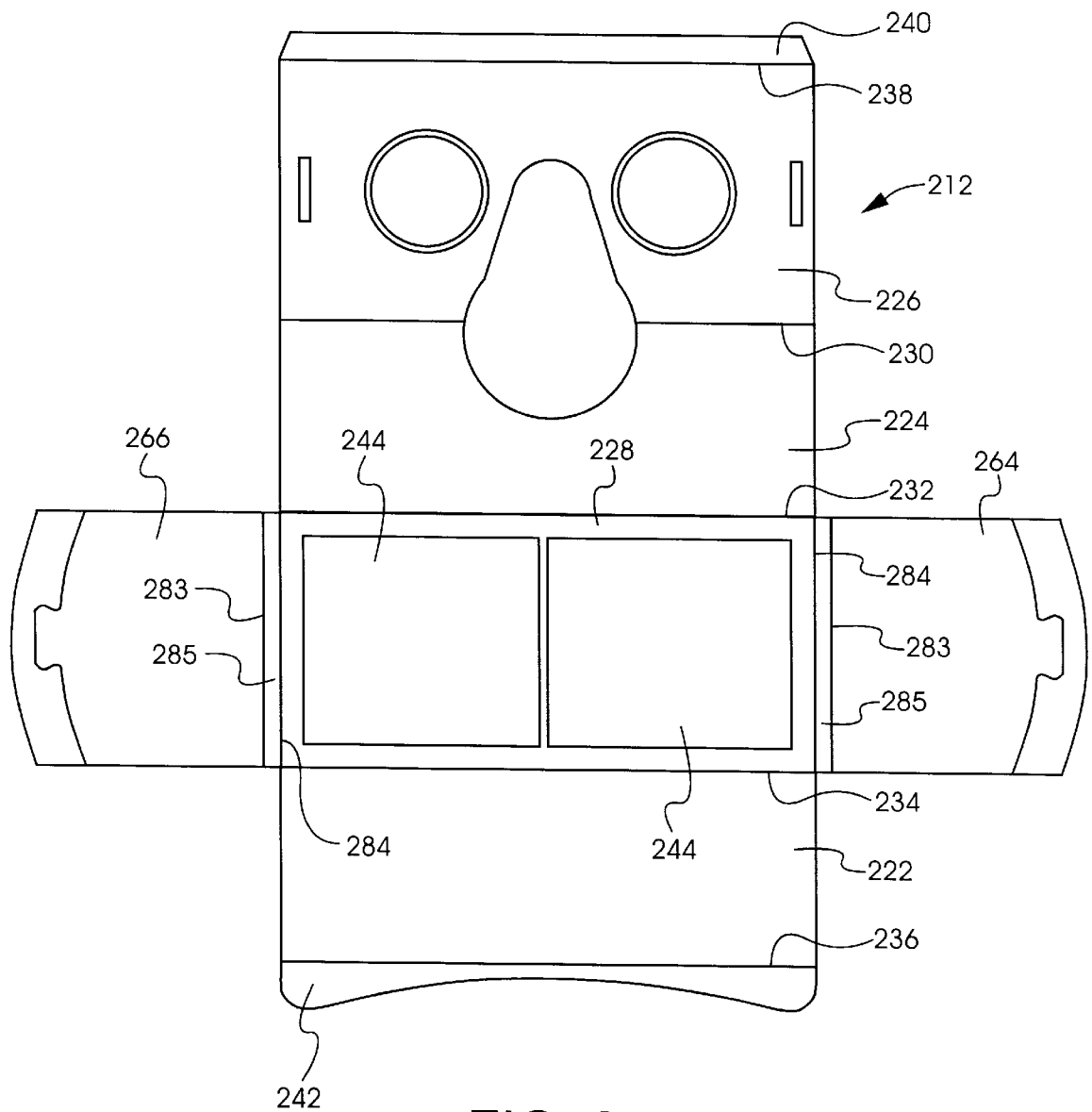
FIG. 6 is plane view of the third preferred embodiment.
Figure 7A:
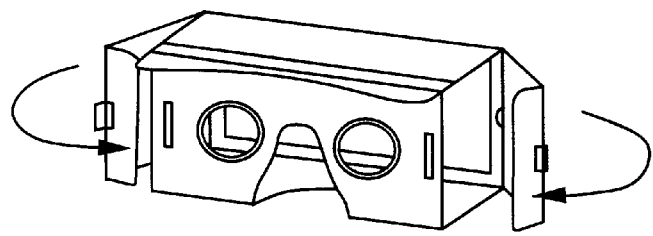
FIGS. 7A, 7B and 7C sequentially illustrate the assembly of a third preferred embodiment.
Figure 7B:
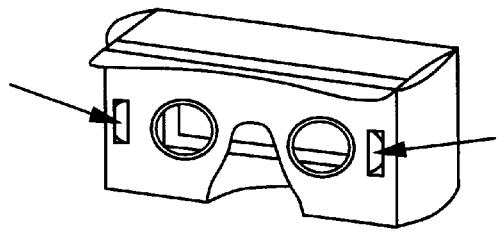
Figure 7C:
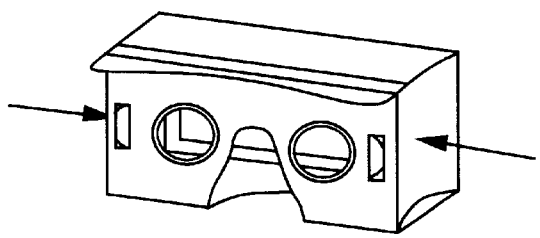
Figure 7D:
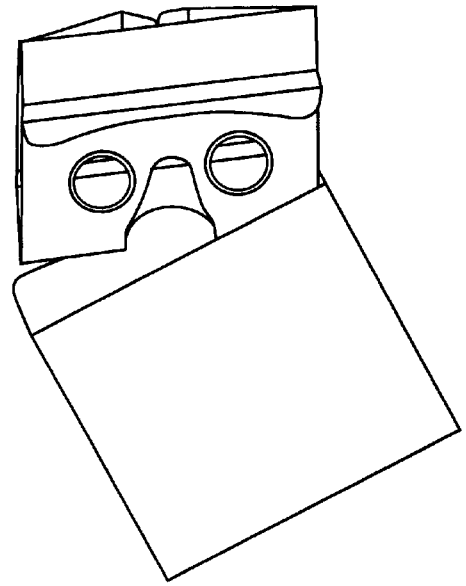
FIG. 7D illustrates the collapsible nature of the third preferred embodiment.
Figure 8:
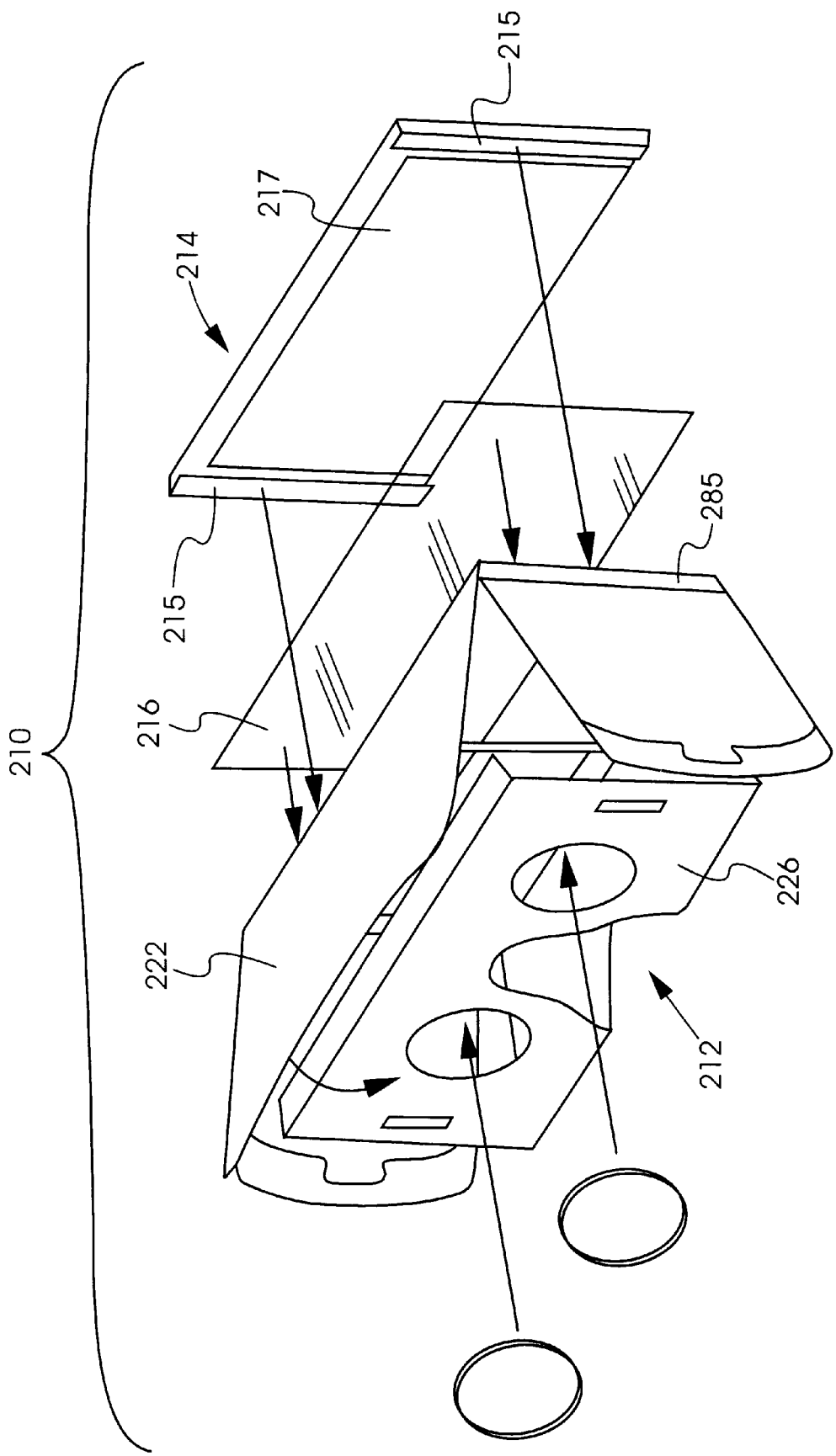
FIG. 8 is a perspective view of the third preferred embodiment.

FIGS. 6, 7 and 8 disclose a third preferred embodiment featuring a frame locking wall having brackets along opposite lateral edges thereof that lock to the rear wall of the main assembly to thereby hold the image in place. More specifically, the third preferred embodiment is a viewer 210 comprised of main assembly 212, and frame locking wall 214. (See FIG. 8). Main assembly comprises top wall 222, bottom wall 224, front wall 226, rear wall 228, right and left side walls 264 and 266, respectively, glue tab 240, and visor 242, which projects from front wall 226 when line 236 is aligned with fold line 238. Right and left side walls 264 and 266 further have fold lines 283 defining hinge section 285. (See FIG. 6.) As shown in FIG. 6, the above-mentioned components are each formed from a single piece of suitable opaque pliable material that has been folded along fold lines 230, 232, 234, 238, 283, and 284, respectively. More specifically, right and left side walls 264 and 266 are folded along fold lines 283 and 284 and then folded back along fold lines 283 such that hinge sections 285 are positioned substantially flat against rear wall 228. As shown in FIG. 8, this configuration provides features to which brackets 215 of frame locking wall 214 attach.

Rear wall 228 has a large window-like openings 244 over which an image strip 216 is placed and locked into place when frame locking wall 214 is attached at brackets 215 to rear wall 228. Frame locking wall 214 of the third embodiment includes a light transmissive sheet 217 laminated on the back face. Frame locking wall 214 may be formed of paper or card stock, but in preferred form, is an injection molded plastic member.

The remaining components, features and construction of the third preferred embodiment are substantially the same as the first and second preferred embodiments. Accordingly, reference should be had to the description of the first preferred embodiment, as such description will not be repeated herein.

Furthermore, FIGS. 7A, 7B, and 7C sequentially illustrate the assembly of a second preferred embodiment; and, FIG. 7D illustrates the collapsible nature of the third preferred embodiment.

SUMMARY

With respect to the above description, it is to be realized that the optimum dimensional relationships for the parts of the invention, to include variations in size, materials, shape, form, function and the manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, the invention is not limited to the exact constructions and operations shown and described. Accordingly, all suitable modifications and equivalents which may be resorted to fall within the scope of the invention.

What is claimed is:

1. A viewer comprising:
   a substantially enclosed housing having at least a front wall and a rear wall,
      wherein said front wall has two lens receiving openings defined therein and first and second lenses affixed thereto,
      wherein said first and second lenses have a focal length of between 45 and 60 millimeters,
      wherein said first and second lenses are affixed in said front wall such that the focal axes of said first and second lenses diverge from one another in the horizontal at an angle of between 0 to 10 degrees from parallel,
      wherein said first and second lenses each have a diameter of between 19 and 31 millimeters;

wherein said rear wall is spaced from said front wall at a distance substantially the same as the focal length of said first and second lenses, wherein said rear wall has at least two images thereon, wherein each of said images has a vertical length of between 52 and 60 millimeters and a horizontal length of between 57 and 60 millimeters, with spacing between the centers of said two images between 60 and 65 millimeters in the horizontal direction.

2. A viewer according to claim 1 wherein said viewer is constructed from at least one of the following materials: paper, paperboard, plastic, or metal.

3. A stereoscopic viewer comprising:

a substantially enclosed housing having at least a front wall and a rear wall, wherein said front wall has two lens receiving openings defined therein and first and second lenses affixed thereto, wherein said first and second lenses each have a focal length of between 45 to 60 millimeters, wherein said lenses are affixed in said front wall such that the focal axes of said first and second lenses diverge in the horizontal at an angle of 0 to 10 degrees from parallel, wherein said first and second lenses each have a diameter of between 19 and 31 millimeters;

wherein said rear wall is spaced from said front wall at a distance substantially the same as the focal length of said first and second lenses, wherein said rear wall has at least two stereoscopically complementary images affixed thereto, wherein said images each have a vertical length of between 52 to 60 millimeters and a horizontal length of between 57 to 60 millimeters, wherein the centers of said images are spaced between 60 to 65 millimeters in the horizontal direction.

4. A viewer according to claim 3 wherein said viewer is constructed from at least one of the following materials: paper, paperboard, plastic, or metal.

5. A stereoscopic viewer that creates an immersive 3-D image, comprising:

a substantially enclosed housing having at least a front wall and a rear wall, wherein said front wall has two lens receiving openings defined therein and first and second lenses affixed thereto, wherein said first and second lenses each have a focal length of between 52 and 58 millimeters, wherein said lenses are affixed in said front wall such that the focal axes of said first and second lenses diverge in the horizontal at an angle of between 5 and 7 degrees from parallel, wherein said first and second lenses have a diameter of between 22 and 28 millimeters;

wherein said rear wall is spaced from said front wall at a distance substantially the same as the focal length of said first and second lenses, wherein said rear wall has at least two stereoscopically complementary images thereon, wherein said images each have a vertical length of between 55 and 59 millimeters and a horizontal length of between 55 and 59 millimeters, wherein the centers of said images are spaced between 60 to 65 millimeters apart in the horizontal direction.

6. A viewer according to claim 5 wherein said viewer is constructed from at least one of the following materials: paper, paperboard, plastic, or metal.

7. A box-like collapsible viewer comprising:

a front wall, said front wall having at least one lens receiving opening defined therein and a lens affixed thereto, said front wall having a bottom edge and a top edge, said front wall having two lateral edges, with at least one slit opening there through along each of said lateral edges of said front wall, a rear wall, said rear wall having at least one light admitting opening defined therein, said rear wall having top, bottom, right, and left edges, a bottom wall, said bottom wall being continuous with both said front and rear walls, along the respective bottom edges of said front and rear walls, a top wall, said top wall being continuous with said rear wall along said top edge of said rear wall, said top wall being attached to said front wall along at least a portion of said top edge of said front wall to define a collapsible box assembly, and a right side wall and a left side wall, said right and left side walls being continuous with said rear wall along right and left fold lines that define said right and left edges of said rear wall, respectively, said right and left side walls having outer edges that are opposite said right and left fold lines defined by right and left arcuate fold lines, said outer edges of said right and left side walls further having key means attached or integral thereto, said outer edges further having tongue flaps, said tongue flaps being continuous with said right and left side walls along said arcuate fold lines of said right and left side walls, said tongue flaps of said right and left side walls adapted to be folded inwardly along said right and left arcuate fold lines, said tongue flaps being positionable between said top and bottom walls of said box assembly, said tongue flaps further being positionable against said front wall of said box assembly, said key means of said right and left side walls being positionable in said slit openings of said front wall of said box assembly, said right and left side walls being of sufficient length such that said outer arcuate edges of said right and left side walls contact the inner face of said front wall, thereby forcing said front wall to conform to the profile of said outer arcuate edges and thereby predisposing the front wall to flex outwardly when the user presses said top and bottom walls together.

8. A viewer according to claim 7 wherein said viewer is constructed from at least one of the following materials: paper, paperboard, plastic, or metal.

9. The collapsible viewer of claim 8 wherein said right and left sidewalls further include right and left hinge sections proximal to said rear wall defined by right and left fold lines, wherein said hinge sections are folded along said fold lines substantially parallel with and positioned against said rear wall, and wherein said viewer further comprises a frame locking wall having first and second brackets along the lateral edges thereof, wherein said first and second brackets engage said hinge sections of said right and left side walls.

10. A viewer according to claim 9 wherein said viewer is constructed from at least one of the following materials: paper, paperboard, plastic, or metal.

11. A collapsible viewer, foldable from a collapsed orientation to a substantially rigid orientation; said viewer comprising:

a front wall,
said front wall having at least one lens receiving opening defined therein and a lens affixed thereto,
said front wall having a bottom edge defined at least in part by a first fold line,
said front wall further having a top edge,
said front wall having at least one slit opening there through along both lateral edges of said front wall, a rear wall,
said rear wall having at least one light admitting opening defined therein,
said rear wall having top and bottom edges defined at least in part by second and third fold lines, a bottom wall,
said bottom wall being continuous with both said front and rear walls, along the respective fold lines that form said bottom edges of said front and rear walls, a top wall,
said top wall being continuous with said rear wall along said fold line that forms said top edge of said rear wall,
said top wall being attached to said front wall along at least a portion of said top edge of said front wall to define a collapsible box assembly, and frame locking means comprising:
frame sheet means,
said frame sheet means having right and left edges defined at least in part by right and left fold lines,
said frame sheet means having at least one opening there through substantially corresponding with said light admitting opening in said rear wall of said collapsible box assembly,
a right side wall and a left side wall,
said right and left side walls being continuous with said frame sheet means along said right and left fold lines that define said right and left edges, respectively,
said right and left side walls having outer edges that are opposite said right and left fold lines defined by right and left arcuate fold lines,
said outer edges of said right and left side walls further having a tab extending from the central regions thereof,
said outer edges further having a tongue flap,
said tongue flaps being continuous with said right and left side walls along said arcing fold lines of said right and left side walls,
said frame sheet means being positionable within said box assembly and against said rear wall of said box assembly,
said tongue flaps of said right and left side walls adapted to be folded inwardly along said right and left arcing fold lines to expose said tabs extending from said outer edge,
said tongue flaps being positionable between said top and bottom walls of said box assembly,
said tongue flaps being positionable against said front wall of said box assembly,
said tabs of said right and left side walls being positionable in said slit openings of said front wall of said box assembly,
said side walls being of sufficient length such that said tongue flaps and said tabs cooperate to lock the side walls into position when the user pushes said side walls inwardly, thereby causing said outer arcuate edges of said right and left side walls to contact the inner face of said front wall, predisposing said front wall to bow outwardly when the user squeezes said top and bottom walls together.

12. A viewer according to claim 11 wherein said viewer is constructed from at least one of the following materials: paper, paperboard, plastic, or metal.

13. A collapsible viewer comprising
an assembly having a front wall, a rear wall, a top wall, and a bottom wall;
said front wall having at least one lens affixed thereto; said front wall further including a first slit opening and a second slit opening;
said assembly further comprising a right side wall extending from said rear wall, and a left side wall extending from said rear wall,
said right and left side walls having outer edges that are opposite said rear wall defined by right and left arcuate fold lines,
said outer edges of said right and left side walls further having a key extending therefrom,
said keys of said right and left side walls being positonable in said slit openings of said front wall,
said right and left side walls being of sufficient length such that said outer arcuate edges of said right and left side walls contact the inner face of said front wall, thereby forcing said front wall to substantially conform to the profile of said outer arcuate edges and thereby predisposing the front wall to flex outwardly, when the user presses said right and left side walls inwardly.

14. The collapsible viewer of claim 13 wherein said outer edges of said right and left side walls further include tongue flaps,
said tongue flaps being continuous with said right and left side walls along said arcuate fold lines of said right and left side walls,
said tongue flaps of said right and left side walls adapted to be folded inwardly along said right and left arcuate fold lines,
said tongue flaps positionable against said front wall of said assembly.

* * * * *